Patented Oct. 26, 1937

2,097,081

UNITED STATES PATENT OFFICE 2,097,081

METHOD OF EXTRACTING PECTIN

William A. Rooker, Martinsburg, W. Va., assignor to National Fruit Products Company, Inc., Washington, D. C.

No Drawing. Application October 10, 1934, Serial No. 747,800

4 Claims. (Cl. 99—133)

This invention relates to a novel method of extracting pectin from pectin containing vegetable matter and to an improved pectin concentrate peculiarly beneficial in the manufacture of conserves and the like.

It is now well known that the jellifying substance of fruits and vegetables may be extracted in concentrated form. This substance, known as pectin, has been marketed for many years both as a substantially dry powder (in admixture with sugar) and as a desugared aqueous concentrate.

There are two principal commercial sources of pectin, namely, apple waste or pomace and cull citrus fruits. The major source at the present time is apple pomace. The present invention therefore will be described with respect to extraction from pomace, but it will be evident that other raw materials may be utilized.

The method of obtaining pectin from apple pomace which is now generally employed comprises essentially first subjecting the dry marc or pomace to a cold water leach and then to digestion in hot acidulated water. The hot water digestion or leach serves to solubilize the pectin and from the aqueous extract the final pectin is produced. This generally involves a filtration and/or clarification treatment followed by concentration. If an aqueous concentrate is to be made, the clarified filtrate is evaporated down to the desired concentration. If powdered pectin is desired, the filtrate is concentrated to some predetermined degree and then the pectin is thrown down by some precipitating agent, alcohol usually being employed.

Such a type of process is subject to a number of disadvantages. These the present invention obviate while at the same time positively assuring real advantages.

Pectin, which is generally conceded to be a methyl ester of pectinic acid is a rather delicate substance. The material hydrolyzes readily particularly in acidic media. Prolonged heating tends to hydrolyze the material with a concomitant loss in jellifying power or strength. Since the jellifying power of the substance largely determines its value, such hydrolysis is a very decided disadvantage. The present invention among other things involves a treatment in which such hydrolysis is markedly diminished, thus insuring a high test pectin.

As noted above, prior methods of extracting pectin involve a preliminary cold water leach. This is for the specific purpose of removing the sugars natural with the fruit and such of the flavors as are water soluble. While pectin is much less soluble in cold than in hot water, yet nevertheless such a cold water leach does remove not an inconsiderable quantity of pectin. When employing a cold water leach the pectin yield is considerably less than would be expectable from a given mass and character of apple pomace. In the present invention such pectin as has been lost heretofore by the cold water leach is retained, and thus the invention insures a higher yield of pectin from any given raw material.

An object of the present invention therefore is to provide a process of extracting pectin which insures a larger yield than heretofore.

Another object is to devise an extraction process which minimizes the loss in jelly strength of the pectin.

A further object is to provide a pectin extraction process in which hydrolysis of the pectin is materially diminished.

Yet another object is to produce a pectin concentrate containing a substance having a beneficial function in the process of jelly making.

A further object is to devise a process which permits of high concentration by evaporation with minimum loss of jellifying power.

A further object is to provide a pectin concentrate which may be employed in the manufacture of jams and jellies and which permits the use of relatively large quantities of sugar in the jelly without undesired crystallization.

With these and other equally important and related objects in view, the invention comprehends the concept of extracting pectin immediately and directly with hot acidulated water and under such circumstances as to insure a given quantity of invert fruit sugars in the mass. As will be noted hereinafter, in the event the raw material is low in fruit or invert sugars, such materials are positively and advisedly added to the mass.

In order to clearly explain the principles of the invention, a preferred process will be described and while this is given with particular reference to apple pomace, it will be appreciated that it is likewise applicable to other starting materials.

The pomace reduced to the desired particle size is deposited in an extractor vat, well known in the art. It may then be covered with acidulated water and heated by means of closed steam coils to a temperature of between approximately 102° and 105° C. for a period of from twenty to thirty minutes. This period in most circumstances is sufficient to bring the pectin content of the fruit into solution.

It is particularly to be observed that the present process sedulously avoids a cold water leach. As a result the mass undergoing extraction contains in addition to the cellulosic and pectin material of the fruit, the sugars natural with the fruit. In the event the starting material is low in fruit sugar, a definite quantity of invert sugar is added either by mixing with the pulp in the vat or in any other desired manner. Such extraneous sugar also may be added at any stage prior to evaporation, but as noted, it is preferred to have the predetermined quantity of the invert sugar present during the extraction. The material treated should contain sufficient sugar so that the final concentrated syrup contains approximately twenty percent of soluble solids of which approximately two percent is pectin and approximately eighteen percent is invert sugar. Therefore, if the raw material is deficient in fruit sugar, the quantity necessary to be added readily may be determined upon analysis.

It is particularly to be noted that the temperatures during extraction should be maintained relatively low and the extraction period should not be prolonged. In order to insure a uniform temperature throughout the mass during the extraction process, the liquid may be withdrawn from the vat and readmitted; that is to say, may be recirculated under pump pressure through the mass.

The temperature may accurately be controlled by providing a heater in the recycle line, through which the flow of the heating medium may be controlled by an automatic thermostatic valve.

The extraction medium as noted above preferably is water acidulated with any suitable acid such as sulphurous or tartaric acid. The acid concentration of the medium need not be high. Thus a typical operation comprises treating a batch of approximately 800 pounds of dry pomace with 800 gallons of water which latter contains substantially 4 pounds of $SO_2$ gas. The temperature during the extraction is maintained constant either by agitating the material within the vat or by continuously recirculating the liquor.

After the described extraction period the liquid is drained from the vat and then filtered in the manner well known in the art. Filter aids may, if desired, be used during such filtration step. Similarly, decolorizing materials may be utilized prior to or during the filtration step.

The filtered and/or clarified liquid containing the soluble pectin and invert sugar is then concentrated by evaporation down to the desired degree. This may be done in the vacuum evaporators now employed in the art.

The ultimate concentrate as noted above contains approximately twenty percent of soluble solids of which substantially eighteen percent are invert sugars.

The presence of the invert sugar is markedly advantageous not only during the extraction treatment but also in the final use of the product, that is in the manufacture of jams, jellies and the like. As intimated hereinbefore pectin hydrolizes very readily. I have found however that such hydrolysis is checked or inhibited by invert sugar. While proposing no definite rationale of this action, it may be that the sugar acts as a protective agent for the pectin; at any rate I have found that in the presence of invert sugar the hydrolysis of pectin in acid media and at elevated temperatures is considerably less than obtains under the same temperatures and acidic conditions in the absence of such sugars.

It is particularly to be observed that this beneficial function of the invert sugar obtains in several phases of the process, namely, in those where hydrolysis is imminent. Thus in the past, considerable pectin was lost due to hydrolysis during the hot acidulation, the conditions of high temperature and acidic medium obviously conducing to such reaction. Furthermore and perhaps more importantly, considerable loss by hydrolysis occurred during evaporation due to the maintenance of relatively high temperatures over a protracted period of time.

In the present process therefore, hydrolysis and consequent loss of jellifying values is diminished not only during extraction but also during evaporation.

I have found furthermore that a relatively large percentage of the fruit sugar, or equivalent, is desirable, especially in view of the fact that by elimination of the cold water leach a larger quantity of extractable pectin is present in the extraction stage. Therefore the amount of the protective agent should be sufficient for this added quantity of pectin.

Again and equally importantly it will be perceived that the fruit or invert sugars subserve beneficial functions in the ultimate product, namely, the fruit jelly or jam.

The invert sugar acts here to inhibit the crystallization of the added sugar and thus enables the use of higher concentrations of syrup with concomitant decrease in the amount of pectin required and the cooking time during jelly making.

The described process of immediate extraction with hot water and with a predetermined amount of natural or added invert sugar is preferred for the reason that it insures an increased yield inasmuch as the pectins heretofore lost during the cold water leach are retained and recovered. It will be appreciated however that the invention is of wider scope than this for if desired some of the advantages described herein could be secured when employing a cold water leach.

Thus if it were not desired to utilize the sugars natural with the fruit because of, say, a low content, or tedium of current analysis, or for the purpose of definitely standardizing a plant operation on any type of raw material, such sugars may be leached out with cold water as in the old method of procedure. During such cold water leach, certain of the coloring matters in the marc would similarly be removed. Then there is preferably added to the marc or the hot extraction solution a quantity of invert sugar predetermined in the manner described and the extraction, filtration and concentration carried out as explained. For some purposes this type of process is desirable as where the advantages of a standardized factory procedure, for whatever reason, more than compensate for the pectin lost during the cold leach.

Within the principles of the invention other modifications of procedure may be made. Thus in some circumstances it may be desirable to add a portion of the invert sugar before the hot water extraction and the remainder after the extraction and prior to evaporation.

The invention therefore is considered to reside in the concept of utilizing the unexpected valuable function of fruit or invert sugar for the purpose of protecing against pectin losses during one or more phases of the treatment where hydrolysis would normally occur. The utilization of such material already available as a natural component of the fruit represents obvious economies which are availed of in the preferred method.

I claim:

1. The process of producing pectin which comprises subjecting pomace, which contains definitely established added amounts of invert sugar and in sufficient quantity to substantially inhibit hydrolysis of the pectin, to the action of hot acidulated water for a period of time sufficient to bring the pectin into solution, and subsequently evaporating the solution while retaining such sugars in solution.

2. A process of producing pectin which comprises subjecting fruit pulp to a cold water leach, draining the mass, adding a predetermined amount of invert sugar which is sufficient to check hydrolysis of the pectin and extracting the pectin from the pulp with hot acidulated water.

3. A process of producing pectin which comprises extracting apple pomace, without any preliminary cold water leach, with a hot acidulated aqueous solution and in the presence of fruit sugar added from an extraneous source and in sufficient quantities to substantially inhibit hydrolysis of the pectin, filtering the resulting solution and then subjecting the solution to concentration by evaporation while retaining the sugar in solution and continuing the concentration until the concentrate contains approximately 18% of sugar.

4. A process of producing pectin which comprises adjusting apple pomace to a predetermined fruit sugar content, by adding thereto fruit sugar from an extraneous source sufficient to increase the fruit sugar content considerably above that natural to the fruit and in sufficient amount to substantially inhibit hydrolysis of the pectin directly extracting the pomace with hot acidulated water, filtering the solution from the pulp and decolorizing the filtrate, subjecting the filtrate containing the fruit sugar to concentration by evaporation to produce a concentrate having a high percentage of soluble solids, of which the fruit sugar constitutes a preponderant component.

WILLIAM A. ROOKER.